UNITED STATES PATENT OFFICE.

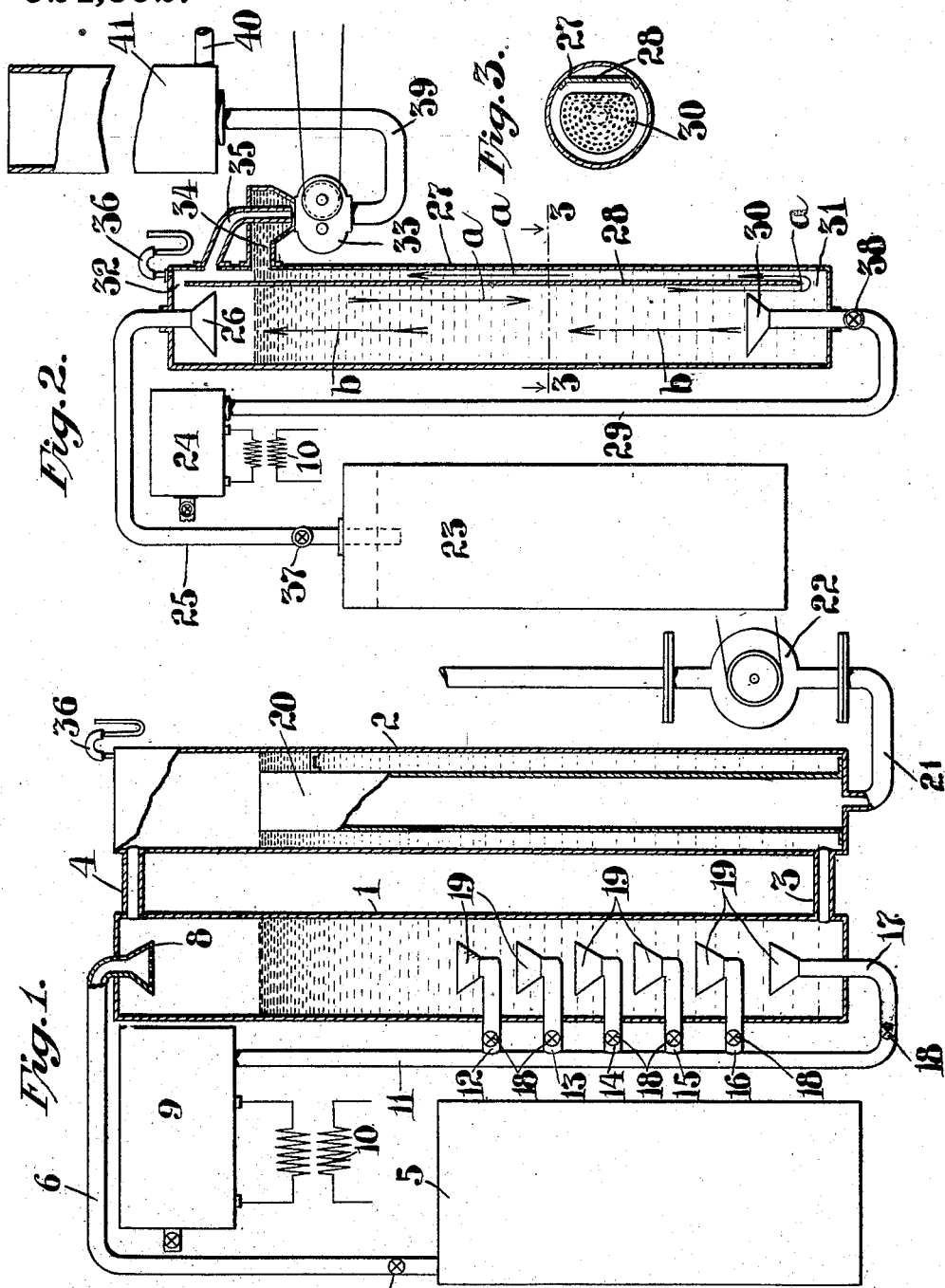

JAN STEYNIS, OF NEW YORK, N. Y.

APPARATUS FOR SIMULTANEOUSLY TREATING LIQUIDS AND GASES CHEMICALLY ACTIVE UPON EACH OTHER.

No. 924,592.

Specification of Letters Patent.

Patented June 8, 1909.

Application filed January 24, 1908. Serial No. 412,377.

*To all whom it may concern:*

Be it known that I, JAN STEYNIS, a subject of the Queen of the Netherlands, and residing at New York, county of New York, State of New York, have invented certain new and useful Improvements in Apparatus for Simultaneously Treating Liquids and Gases Chemically Active Upon Each Other, of which the following is a full, clear, and complete disclosure.

The object of my invention is to provide an apparatus for the simultaneous treatment of liquids and gases having chemical reactions, such as are produced when a liquid is treated with a gas for the purpose of purifying such liquid.

A further object of my invention is to provide an apparatus that may be operated by the use of a single pump, without the necessity of raising the liquid to great heights, thereby unnecessarily absorbing power.

A further object of my invention is to provide an apparatus which may be used in connection with means for generating gases, such as oxygen or ozone, which are introduced into the liquid for purifying the same.

A further object of my invention is to provide apparatus for carrying out a process for treating liquids, such as water, to purify the same, whereby the liquid is not only submitted to the action of the purifying gas in large quantities, but is completely treated and the gas entirely separated from the water or other liquid before the liquid is put into further use.

For detailed descriptions of two forms of my invention which I at present deem preferable, reference may be had to the following specification and the accompanying drawings forming a part thereof, in which—

Figure 1 is a diagrammatic view showing the apparatus in elevation and partly in section; Fig. 2 is a corresponding view of a modified form; and Fig. 3 is a horizontal sectional view taken on the lines 3—3, Fig. 2.

Referring to the drawings, the numerals 1 and 2 indicate two cylinders connected at points adjacent their tops and bottoms by two tubes 3 and 4.
The numeral 5 indicates a reservoir or other container for liquids, and is provided with a pipe 6, which enters at top of the cylinder 1. This pipe is provided with a valve 7, and at the end which terminates within the cylinder 1, it is provided with a perforated sprinkler 8.

The numeral 9 indicates a gasometer or gas generator, and may be provided with electric connections for producing ozone by means of the action of streaming or silent electric discharges, as indicated at 10. This reservoir or generator 9 is connected with the cylinder 1 by means of a main pipe 11, provided with a series of branch pipes at different levels, as indicated at 12, 13, 14, 15, 16 and 17. These pipes are provided with suitable cocks or valves, as indicated at 18, and their ends terminate in expanded perforated mouth pieces, indicated at 19, and similar to the perforated sprinkler 8.

The cylinder 2 incloses a concentric cylinder or pipe 20, the upper end of which terminates at a point below the level of the connecting pipe 4 and below the level of the perforated sprinkler 8; said end being opened to allow liquids surrounding the said pipe 20 to flow downward toward the bottom of the apparatus. The lower end of the pipe 20 rests upon the lower end of the cylinder 2, and is connected by means of a conduit 21 with the rotary suction pump 22. In the operation of this apparatus, the gas inlet valves 18 being closed, the pump 22 is started and produces a vacuum, or partial vacuum, in the cylinders 1 and 2, thereby drawing the liquid through the inlet pipe 6 and causing the same to fall into the cylinder 1 in the form of finely divided drops like rain. The level of the liquid thus introduced into the cylinders 1 and 2 rises until it reaches the level of the top of the inner concentric cylinder or pipe 20, and then overflows into the latter. The gas inlet valves 18 may then be opened, and the gas flows out of the perforated nozzles, passing upward through the interior of the cylinder 1 to a greater or less degree, according to the suction of the vacuum pump. By regulating the speed of the motor driving the pump and the gas and liquid inlet valves, as well as by a correct adjustment of the height of the liquid above one of the perforated gas inlets, the degree of vacuum and, therefore, the amount of liquid and gas that react upon each other, may be varied.

In Figs. 2 and 3 of the drawings, a modification of the apparatus is shown which is of especial advantage where it is desired to sterilize water by the use of ozone. In this form of the construction of the apparatus, the numeral 23 represents the reservoir or other source of supply of the liquid, and 24 is the source of supply of the gas, such as an ozone generator. The reservoir 23 is connected by a pipe 25 with the cylinder 27, and is provided at its end with a perforated sprinkler 26, similar to that described in connection with the form of apparatus first mentioned. The opposite end of the pipe 25 is submerged in the reservoir 23. The cylinder 27 is provided with a vertical plate or partition 28, which divides the interior into two compartments of different sizes. The gas reservoir or ozone generator 24 is connected by a pipe 29 with the lower portion of the cylinder 27, and this tube also terminates in the larger compartment of the cylinder and is provided with a perforated nozzle 30. The passages 32 and 31, provided, respectively, above and below the partition 28, permit communication between the two compartments of the cylinder, the gas being allowed to pass through the upper passage 32, while the liquid passes through the lower passage 31. The pump 33 draws the liquid away through a conduit 34 of a larger diameter than the pipe 25; a second conduit 35 is also connected with the pump and enters the cylinder 27 above the normal level of the liquid therein. This conduit 35, at its lower end, is placed concentric with the conduit 34, where it enters the pump, as shown in Fig. 2 of the drawing. This arrangement of the outlet conduits is preferable, in view of the fact that the level of the liquid does not remain constant and, therefore, if only one outlet conduit were used, the gas might not be withdrawn. In the arrangement shown the gas that does not pass through the conduit 39 is drawn through the conduit 35. A gage 36 is preferably provided at the top of the cylinder 27 as shown, in order to indicate the amount of the vacuum, and valves 37 and 38 are preferably provided in the pipes 25 and 29 respectively. In the operation of this form of the apparatus, the valves 37 and 38 being open and the apparatus being supposed to be in operation, the liquid is drawn by the pump through the pipe 25 and falls in drops like rain from the perforated sprinkler 26 into the larger compartment of the cylinder 27. It then collects in this cylinder at a constant level determined by the conduit 34. The flow of the liquid is established in the larger and smaller compartments in the directions indicated by the arrows $a$. The ozone or other gas passes through the body of the liquid in the larger compartment in the direction of the arrow $b$ and separates in the upper portion of the cylinder 27, whence it is drawn through the pipe 35 at the same time that the water from the smaller compartment is drawn through the conduit 34. Any adhesion or contact of the ozone with the water which may remain until the passage through the pump is entirely broken up in the pump in which the agitation or churning action completes the sterilization. The pump 33 discharges into a conduit 39, which may be connected with the water supply system of a city by means of the pipe 40. A stand-pipe 41 is preferably provided to allow the gas or ozone to separate from the water, and this obviously should be of such a height as to correspond to the pressure in the mains.

What I claim and desire to protect by Letters Patent is:

1. An apparatus for treating liquids and gases comprising a mixing chamber, a liquid inlet for producing a downward current of the liquid therein, a gas inlet for producing an upward current of the gas, means for maintaining a constant level of the liquid in said chamber, a suction apparatus for simultaneously withdrawing and agitating the liquid and the gas.

2. An apparatus for treating liquids and gases, a mixing chamber, an inlet for the liquid at the upper end of said chamber, an inlet for the gas in the lower portion of said chamber, means for maintaining a constant level of the liquid therein, and a suction apparatus for simultaneously withdrawing the liquid and gas and for thoroughly agitating and mixing the same.

3. An apparatus for treating liquids and gases comprising a mixing chamber, a perforated inlet nozzle for the liquid in the upper portion of said chamber, perforated inlet nozzles for the gas in the lower portion of said chamber, valves controlling the flow to said gas inlet nozzles, means for maintaining a constant level of the liquid, and a suction apparatus for simultaneously withdrawing and agitating the liquid and the gas.

4. An apparatus for treating liquids and gases, comprising a mixing chamber, a liquid inlet at its upper end, gas inlets in its lower portion, a gas discharge conduit connected with the upper end of said chamber, a liquid discharge conduit connected with the lower end of said chamber, means for maintaining a constant level of the liquid in said chamber, and a suction apparatus for simultaneously drawing the liquid and gas through said conduits and for mixing and agitating the same.

5. In an apparatus for treating liquids and gases, the combination with a gas generator of a receptacle forming a mixing chamber, a vertical partition in said chamber extending to a point adjacent the top and adjacent the bottom, a liquid outlet connected with the upper portion of said receptacle for maintaining a constant level of the liquid therein, a gas outlet above said liquid outlet and communicating with said liquid outlet, and a suction apparatus connected with said liquid outlet and with said gas outlet for simultaneously withdrawing and agitating the liquid and the gas.

6. In an apparatus for treating liquids and gases, the combination with an ozone generator of a receptacle forming a mixing chamber, a gas inlet in the lower portion of said receptacle connected with said generator, means for maintaining a constant level of the liquid in said receptacle, a vertical partition in said receptacle having passages at its upper and lower ends, means for maintaining a constant level of the liquid in said receptacle, a suction apparatus, gas and liquid conduits connected respectively with said receptacle and with said suction apparatus.

Signed at New York, State of New York, this 23rd day of January, 1908.

JAN STEYNIS.

Witnesses:
JAMES J. COSGROVE,
EDWARD W. VAILL, Jr.